United States Patent Office 3,259,544
Patented July 5, 1966

3,259,544
ANTIDIABETIC COMPOSITION AND METHOD
John B. Wright, Kalamazoo, Mich., assignor to The Upjohn Company, Kalamazoo, Mich., a corporation of Delaware
No Drawing. Original application Apr. 7, 1960, Ser. No. 20,522, now Patent No. 3,072,720, dated Jan. 8, 1963. Divided and this application Nov. 14, 1962, Ser. No. 237,738
8 Claims. (Cl. 167—65)

This application is a division of application Serial No. 20,522, filed April 7, 1960, now U.S. Patent 3,072,720, granted January 8, 1963.

The present invention relates to novel N-arylsulfonyl-N'-(2,5-endomethylene - 1,2,5,6 - tetrahydrobenzyl)ureas and to orally active compositions containing said novel compounds as active ingredients.

The novel N-arylsulfonyl-N'-(2,5-endomethylene-1,2,5,6-tetrahydrobenzyl)ureas of the present invention can be represented by the formula:

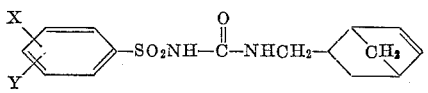

wherein X and Y represent hydrogen; alkyl containing 1 to 4 carbon atoms, inclusive, e.g., methyl, ethyl, propyl, butyl, isopropyl, isobutyl, and the like; alkoxy containing 1 to 4 carbon atoms, inclusive, e.g., methoxy, ethoxy, propoxy, butoxy, sec-butoxy, and the like; the acyl group of an alkanoic acid containing 2 to 4 carbon atoms, inclusive, e.g., acetyl, propionyl, butyryl, and isobutyryl; halogen, e.g., chlorine, bromine, and fluorine; and the primary amino radical ($NH_2$).

The novel compounds of the present invention are orally active antidiabetic agents useful for lowering blood sugar content in mammals to a safe level for periods of time and at dosages of the order disclosed below. The novel compounds are also useful as wetting, emulsifying and waterproofing agents in the paper and leather industry.

The novel N-arylsulfonyl-N'-(2,5-endomethylene-1,2, 5,6-tetrahydrobenzyl)ureas of the present invention can be prepared by reacting an arylsulfonylurethane having the formula:

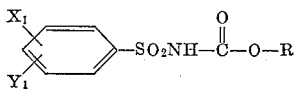

wherein R represents alkyl containing 1 to 6 carbon atoms, inclusive, and $X_1$ and $Y_1$ represent hydrogen; alkyl containing 1 to 4 carbon atoms, inclusive, e.g., methyl, ethyl, propyl, butyl, isopropyl, isobutyl, and the like; alkoxy containing 1 to 4 carbon atoms, inclusive, e.g., methoxy, ethoxy, propoxy, butoxy, sec-butoxy, and the like; the acyl group of an alkanoic acid containing 2 to 4 carbon atoms, inclusive, e.g., acetyl, propionyl, butyryl, and isobutyryl; halogen, e.g., chlorine, bromine, and fluorine; and nitro, with 2,5-endomethylene-1,2,5,6-tetrahydrobenzylamine having the formula:

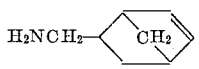

according to the process disclosed by Marshall et al., J. Org. Chem. 23, 927, 1958.

The preparation of compounds of the invention having amino ($NH_2$) substitution on the benzene ring, i.e., N - (aminobenzenesulfonyl) - N' - (2,5 - endomethylene-1,2,5,6-tetrahydrobenzyl)ureas, involves utilizing a nitro-substituted arylsulfonylurethane, i.e., a nitrobenzenesulfonylurethane, to produce the corresponding intermediate N - (nitrobenzenesulfonyl)-N'-(2,5-endomethylene-1,2,5,6-tetrahydrobenzyl)urea, which can be catalytically hydrogenated, e.g., using a platinum oxide or palladium-on-charcoal catalyst, to produce the desired N - (aminobenzenesulfonyl) - N' - (2,5 - endomethylene-1,2,5,6-tetrahydrobenzyl)urea.

The starting arylsulfonylurethanes, many of which are known, can be prepared as disclosed by Marshall et al., supra.

The starting 2,5 - endomethylene - 1,2,5,6 - tetrahydrobenzylamine can be prepared according to the process disclosed by Alder et al., Ber. 71, 1953, 1938, which process involves reacting allylamine with cyclopentadiene at a temperature of about 170° C.

The starting 2,5 - endomethylene - 1,2,5,6 - tetrahydrobenzylamine can also be prepared by reacting 2,5-endomethylene-1,2,5,6-tetrahydrobenzaldehyde with hydroxylamine, preferably in the presence of pyridine, picoline, or the like, to produce 2,5-endomethylene-1,2,5,6-tetrahydrobenzaldehyde oxime and reducing the oxime with lithium aluminum hydride.

The following examples are illustrative of the process and products of the present invention, but are not to be construed as limiting.

EXAMPLE 1. — N - (4 - METHYLBENZENESULFONYL)-N'-(2,5-ENDOMETHYLENE-1,2,5,6 - TETRAHYDROBENZYL)UREA

A. *2,5-endomethylene-1,2,5,6-tetrahydrobenzaldehyde oxime*

A mixture of 24.4 g. (0.2 mole) of 2,5-endomethylene-1,2,5,6-tetrahydrobenzaldehyde (Diels et al., Ann. 460, 119, 1928), 13.9 g. (0.2 mole) of hydroxylamine hydrochloride, 100 ml. of dry pyridine, and 100 ml. of absolute ethanol was refluxed for 3 hours. The solvents were removed under reduced pressure at 40° C. The residue was diluted with 100 ml. of water, the mixture was extracted with ether, and the ether extract was dried with anhydrous magnesium sulfate and concentrated to dryness. The residual yellow oil weighing 27.9 g. was dissolved in ether and the solution was extracted with 5% aqueous sodium hydroxide solution. The alkaline solution was acidified with acetic acid, the resulting mixture was extracted with ether, and the ether extract was dried with anhydrous magnesium sulfate and concentrated to dryness, to give 25.4 g. of 2,5-endomethylene-1,2,5,6-tetrahydrobenzaldehyde oxime as a yellow oil.

B. *2,5-endomethylene-1,2,5,6-tetrahydrobenzylamine*

A mixture of 19 g. (0.5 mole) of lithium aluminum hydride and 400 ml. of ether was refluxed for 1 hour. To the mixture was cautiously added 25.4 g. (0.184 mole) of 2,5-endomethylene-1,2,5,6-tetrahydrobenzaldehyde oxime dissolved in 100 ml. of ether. The mixture was refluxed for 2 hours before being decomposed by the successive addition of 7.4 ml. of water, 5.5 ml. of 20% aqueous sodium hydroxide solution, and 25.8 ml. of water. The mixture was filtered and the filter cake was washed with ether. The filtrate, including washes, was dried over anhydrous magnesium sulfate and concentrated to dryness. The residue was distilled under reduced pressure to give 9.54 g. (43% of theory) of 2,5-endomethylene-1,2,5,6-tetrahydrobenzylamine as a colorless oil boiling at 65–69° C./14 mm.

*Analysis.*—Calcd. for $C_8H_{13}N$: C, 77.99; H, 10.64; N, 11.37. Found: C, 78.17; H, 10.17; N, 11.37.

C. *N-(4-methylbenznesulfonyl)-N'-(2,5-endomethylene-1,2,5,6-tetrahydrobenzyl)urea*

A mixture of 24.33 g. (0.1 mole) of 4-methylbenzene sulfonylurethane and 12.52 g. (0.1 mole) of 2,5-endomethyl-1,2,5,6-tetrahydrobenzylamine was stirred and heated at 130° C. for 2 hours and then heated at the same temperature, under reduced pressure, to remove ethanol formed during the reaction. The residue was recrystallized from isopropyl alcohol. The crystals obtained were stirred with 500 ml. of 1 N hydrochloric acid for 1.5 hours, the mixture was then filtered, and the cake was washed with water. The damp cake was then recrystallized from ethanol to give 17.44 g. (54.5% of theory) of N-(4-methylbenzenesulfonyl)-N' - (2,5 - endomethylene 1,2,5,6-tetrahydrobenzyl)urea which melted at 178–180° C.

*Analysis.*— Calcd. for $C_{16}H_{20}N_2O_3S$: C, 59.98; H, 6.29; N, 8.75; S, 10.01. Found: C, 60.03; H, 6.03; N, 8.76; S, 10.02.

EXAMPLE 2.—N - (4 - CHLOROBENZENESULFONYL)-N'-(2,5-ENDOMETHYLENE-1,2,5,6 - TETRAHYDROBENZYL)UREA

A mixture of 20.1 g. (0.077 mole) of 4-chlorobenzenesulfonylurethane and 9.4 g. (0.077 mole) of 2,5-endomethylene-1,2,5,6-tetrahydrobenzylamine was stirred and heated at 130° C. for 2 hours, and then heated at the same temperature, under reduced pressure, to remove the ethanol formed during the reaction. Upon recrystallization of the residue from ethyl acetate there was obtained 13.8 g. of tan prisms melting at 169–172° C. A second recrystallization from ethyl acetate gave N-(4-chlorobenzenesulfonyl)-N'-(2,5-endomethylene - 1,2,5,6 - tetrahydrobenzyl)urea which melted at 173–176° C.

*Analysis.*—Calcd. for $C_{15}H_{17}ClN_2O_3S$: C, 52.86; H, 5.03; Cl, 10.40; N, 8.22; S, 9.41. Found: C, 53.21; H, 5.40; Cl, 10.50; N, 8.09; S, 9.17.

EXAMPLE 3.—N - (4 - METHOXYBENZENESULFONYL)-N'-(2,5-ENDOMETHYLENE-1,2,5,6 - TETRAHYDROBENZYL)UREA

In the same manner as shown in Example 1, Part C, N-(4-methoxybenzenesulfonyl)-N'-(2,5, - endomethylene-1,2,5,6-tetrahydrobenzyl)urea was prepared by using 4-methoxybenzenesulfonylurethane instead of 4-methylbenzenesulfonylurethane.

EXAMPLE 4.—N-BENZENESULFONYL-N'-(2,5-ENDOMETHYLENE - 1,2,5,6 - TETRAHYDROBENZYL)UREA

In the same manner as shown in Example 1, Part C, N-benzenesulfonyl-N'-(2,5-endomethylene-1,2,5,6 - tetrahydrobenzyl)urea was prepared by using benzenesulfonylurethane instead of 4-methylbenzenesulfonylurethane.

EXAMPLE 5.—N - (3,4 - DIETHYLBENZENESULFONYL)-N'-(2,5-ENDOMETHYLENE-1,2,5,6 - TETRAHYDROBENZYL-UREA

In the same manner as shown in Example 1, Part C, N-(3,4-diethylbenzenesulfonyl)-N'-(2,5 - endomethylene-1,2,5,6-tetrahydrobenzyl)urea was prepared by using 3,4-diethylbenzenesulfonylurethane instead of 4-methylbenzenesulfonylurethane.

EXAMPLE 6.—N-(3,4 - DIBROMOBENZENESULFONYL)-N'-(2,5-ENDOMETHYLENE-1,2,5,6 - TETRAHYDROBENZYL)UREA

In the same manner as shown in Example 1, Part C, N-(3,4-dibromobenzenesulfonyl)-N' - (2,5 - endomethylene-1,2,5,6-tetrahydrobenzyl)urea was prepared by using 3,4-dibromobenzenesulfonylurethane instead of 4-methylbenzenesulfonylurethane.

EXAMPLE 7.—N - (3,4 - DIETHOXYBENZENESULFONYL-N'-(2,5-ENDOMETHYLENE - 1,2,5,6-TETRAHYDROBENZYL)UREA

In the same manner as shown in Example 1, Part C, N-(3,4-diethoxybenzenesulfonyl)-N'-(2,5-endomethylene-1,2,5,6-tetrahydrobenzyl)urea was prepared by using 3,4-diethoxybenzenesulfonylurethane instead of 4-methylbenzenesulfonylurethane.

EXAMPLE 8.—N-(4-PROPYLBENZENESULFONYL)-N'-(2,5-ENDOMETHYLENE - 1,2,5,6 - TETRAHYDROBENZYL)UREA

In the same manner as shown in Example 1, Part C, N-(4-propylbenzenesulfonyl)-N' - (2,5 - endomethylene-1,2,5,6-tetrahydrobenzyl)urea was prepared by using 4-propylbenzenesulfonylurethane instead of 4-methylbenzenesulfonylurethane.

EXAMPLE 9.—N-(4-BUTYLBENZENESULFONYL)-N' - (2,5 - ENDOMETHYLENE - 1,2,5,6 - TETRAHYDROBENZYL)UREA

In the same manner as shown in Example 1, Part C, N - (4-butylbenzenesulfonyl) - N' - (2,5-endomethylene-1,2,5,6-tetrahydrobenzyl)urea was prepared by using 4-butylbenzenesulfonylurethane instead of 4-methylbenzenesulfonylurethane.

EXAMPLE 10.—N - (3 - PROPOXYBENZENESULFONYL) - N'-(2,5-ENDOMETHYLENE-1,2,5,6-TETRAHYDROBENZYL)UREA

In the same manner as shown in Example 1, Part C, N - (3-propoxybenzenesulfonyl)-N'-(2,5-endomethylene-1,2,5,6-tetrahydrobenzyl)urea was prepared by using 3-propoxybenzenesulfonylurethane instead of 4-methylbenzenesulfonylurethane.

EXAMPLE 11.—N - (4 - BUTOXYBENZENESULFONYL) - N'-(2,5-ENDOMETHYLENE-1,2,5,6-TETRAHYDROBENZYL)UREA

In the same manner as shown in Example 1, Part C, N-(4-butoxybenzenesulfonyl) - N' - (2,5-endomethylene-1,2,5,6-tetrahydrobenzyl)urea was prepared by using 4-butoxybenzenesulfonylurethane instead of 4-methylbenzenesulfonylurethane.

EXAMPLE 12.—N - (4 - FLUOROBENZENESULFONYL) - N'-(2,5-ENDOMETHYLENE-1,2,5,6-TETRAHYDROBENZYL)UREA

In the same manner as shown in Example 1, Part C, N - (4-fluorobenzenesulfonyl) - N' - (2,5-endomethylene-1,2,5,6-tetrahydrobenzyl)urea was prepared by using 4-fluorobenzenesulfonylurethane instead of 4-methylbenzenesulfonylurethane.

EXAMPLE 13.—N-(3,4-DICHLOROBENZENESULFONYL) - N'-(2,5-ENDOMETHYLENE-1,2,5,6-TETRAHYDROBENZYL)UREA

In the same manner as shown in Example 1, Part C, N - (3,4 - dichlorobenzenesulfonyl) - N' - (2,5 - endomethylene-1,2,5,6-tetrahydrobenzyl)urea was prepared by using 3,4-dichlorobenzenesulfonylurethane instead of 4-methylbenzenesulfonylurethane.

EXAMPLE 14.—N - (3 - METHYL-4-CHLOROBENZENESULFONYL) - N' - (2,5-ENDOMETHYLENE-1,2,5,6-TETRAHYDROBENZYL)UREA

In the same manner as shown in Example 1, Part C, N - (3-methyl-4-chlorobenzenesulfonyl) - N' - (2,5-endomethylene-1,2,5,6-tetrahydrobenzyl)urea was prepared by using 3-methyl-4-chlorobenzenesulfonylurethane instead of 4-methylbenzenesulfonylurethane.

EXAMPLE 15.—N - (3-METHOXY-4-CHLOROBENZENESULFONYL) - N' - (2,5-ENDOMETHYLENE-1,2,5,6-TETRAHYDROBENZYL)UREA

In the same manner as shown in Example 1, Part C, N - (3-methoxy-4-chlorobenzenesulfonyl)-N'-(2,5-endomethylene-1,2,5,6-tetrahydrobenzyl)urea was prepared by using 3-methoxy-4-chlorobenzenesulfonylurethane instead of 4-methylbenzenesulfonylurethane.

EXAMPLE 16.—N - (3 - AMINOBENZENESULFONYL) - N'-(2,5-ENDOMETHYLENE-1,2,5,6-TETRAHYDROBENZYL)UREA

A. *N-(3-nitrobenzenesulfonyl)-N'-(2,5-endomethylene-1,2,5,6-tetrahydrobenzyl)urea*

In the same manner as shown in Example 1, Part C, N - (3-nitrobenzenesulfonyl) - N' - (2,5-endomethylene-1,2,5,6-tetrahydrobenzyl)urea was prepared by using 3-nitrobenzenesulfonylurethane instead of 4-methylbenzenesulfonylurethane.

B. *N-(3-aminobenzenesulfonyl)-N'-(2,5-endomethylene-1,2,5,6-tetrahydrobenzyl)urea*

N - (3 - nitrobenzenesulfonyl) - N' - (2,5 - endomethylene-1,2,5,6-tetrahydrobenzyl)urea was hydrogenated in an aqueous ammonium hydroxide solution containing 1.5% ammonia, by weight, with 10% palladium-on-charcoal catalyst. The resulting crude product, obtained by filtering the reaction mixture and evaporating the filtrate to dryness, was recrystallized from 95% ethanol to produce N-(3-aminobenzenesulfonyl) - N' - (2,5-endomethylene-1,2,5,6-tetrahydrobenzyl)urea.

EXAMPLE 17.—N-(3-AMINO-4-METHYLBENZENESULFONYL) - N'-(2,5-ENDOMETHYLENE-1,2,5,6-TETRAHYDROBENZYL)UREA

A. *N-(3-nitro-4-methylbenzenesulfonyl)-N'-(2,5-endomethylene-1,2,5,6-tetrahydrobenzyl)urea*

In the same manner as shown in Example 1, Part C, N - (3-nitro-4-methylbenzenesulfonyl) - N' - (2,5-endomethylene-1,2,5,6-tetrahydrobenzyl)urea was prepared by using 3-nitro-4-methylbenzenesulfonylurethane instead of 4-methylbenzenesulfonylurethane.

B. *N-(3-amino-4-methylbenzenesulfonyl)-N'-(2,5-endomethylene-1,2,5,6-tetrahydrobenzyl)urea*

In the same manner as shown in Example 16, Part B, N - (3-amino-4-methylbenzenesulfonyl) - N' - (2,5-endomethylene-1,2,5,6-tetrahydrobenzyl)urea was prepared by hydrogenating N-(3-nitro-4-methylbenzenesulfonyl) - N'-(2,5-endomethylene-1,2,5,6-tetrahydrobenzyl)urea instead of N-(3-nitrobenzenesulfonyl) - N' - (2,5-endomethylene-1,2,5,6-tetrahydrobenzyl)urea.

EXAMPLE 18.—N - (4 - ACETYLBENZENESULFONYL) - N' - (2,5 - ENDOMETHYLENE-1,2,5,6-TETRAHYDROBENZYL)UREA

In the same manner as shown in Example 1, Part C, N -(4-acetylbenzenesulfonyl) - N' - (2,5-endomethylene-1,2,5,6-tetrahydrobenzyl)urea was prepared by using 4-acetylbenzenesulfonylurethane instead of 4-methylbenzenesulfonylurethane.

EXAMPLE 19.—N - (2 - METHYLBENZENSULFONYL) - N'-(2,5-ENDOMETHYLENE-1,2,5,6-TETRAHYDROBENZYL)UREA

In the same manner as shown in Example 1, Part C, N - (2 - methylbenzenesulfonyl)-N'-(2,5-endomethylene-1,2,5,6-tetrahydrobenzyl)urea was prepared by using 2-methylbenzenesulfonylurethane instead of 4-methylbenzenesulfonylurethane.

EXAMPLE 20.—N-(4-ISOPROPYLBENZENESULFONYL) - N'-(2,5-ENDOMETHYLENE-1,2,5,6-TETRAHYDROBENZYL)UREA

In the same manner as shown in Example 1, Part C, N - (4 - isopropylbenzenesulfonyl)-N'-(2,5-endomethylene-1,2,5,6-tetrahydrobenzyl)urea was prepared by using 4-isopropylbenzenesulfonylurethane instead of 4-methylbenzenesulfonylurethane.

EXAMPLE 21.—N - (2 - CHLOROBENZENESULFONYL) - N'-(2,5-ENDOMETHYLENE-1,2,5,6-TETRAHYDROBENZYL)UREA

In the same manner as shown in Example 1, Part C, N-(2-chlorobenzenesulfonyl) - N' - (2,5-endomethylene-1,2,5,6-tetrahydrobenzyl)urea was prepared by using 2-chlorobenzenesulfonylurethane instead of 4-methylbenzenesulfonylurethane.

EXAMPLE 22.—N - (2,4-DIBUTYRYLBENZENESULFONYL) - N'-(2,5-ENDOMETHYLENE-1,2,5,6-TETRAHYDROBENZYL)UREA

In the same manner as shown in Example 1, Part C, N - (2,4 - dibutyrylbenzenesulfonyl)-N'-(2,5-endomethylene-1,2,5,6-tetrahydrobenzyl)urea was prepared by using 2,4-dibutyrylbenzenesulfonylurethane instead of 4-methylbenzenesulfonylurethane.

EXAMPLE 23.—N - (4 - CHLORO-3-METHYLBENZENESULFONYL) - N' - (2,5-ENDOMETHYLENE-1,2,5,6-TETRAHYDROBENZYL)UREA

In the same manner as shown in Example 1, Part C, N - (4 - chloro - 3 - methylbenzenesulfonyl)-N'-(2,5-endomethylene-1,2,5,6-tetrahydrobenzyl)urea was prepared by using 4-chloro-3-methylbenzenesulfonylurethane instead of 4-methylbenzenesulfonylurethane.

As indicated hereinbefore the compounds of the present invention are useful in the lowering of blood sugar perorally and for this purpose the active compounds are associated with a pharmaceutically acceptable carrier.

For such oral administration the active compounds can be administered in liquid or solid dosage forms. Solid forms include capsules, tablets, powders, pills, granules, and the like, and liquid forms include suitably flavored aqueous suspensions and solutions (depending on concentration desired, and flavored oil suspensions and solutions wherein edible oils, e.g., corn oil, cottonseed oil, coconut oil, peanut oil, sesame oil, or mixtures of these, and the like can be employed.

For preparing compositions such as tablets and other compressed formulations the composition can include any compatible and edible tableting material used in pharmaceutical practice; e.g., corn starch, lactose, dibasic calcium phosphate, stearic acid, magnesium stearate, talc, methylcellulose, and the like, can be employed.

Similarly, the compounds of the present invention can be mixed with suitable adjuvants for the preparation of resorbable hard gelatin or soft gelatin capsules utilizing conventional pharmaceutical practices.

The following illustrative compositions are within the scope of the present invention:

(1) HARD GELATIN CAPSULES 10,000 two-piece hard gelatin capsules for oral use, each containing 150 milligrams of N-(4-chlorobenzenesulfonyl) - N' - (2,5 - endomethylene-1,2,5,6-tetrahydrobenzyl)urea are prepared from the following amounts and types of materials:

| | Gm. |
|---|---|
| N - (4 - chlorobenzenesulfonyl) - N' - (2,5-endomethylene-1,2,5,6-tetrahydrobenzyl)urea | 1500 |
| Corn starch | 1616 |
| Mineral oil, U.S.P. | 129.6 |
| Magnesium stearate, powder | 162 |
| Talc, U.S.P. | 162 |

The powdered N - (4-chlorobenzenesulfonyl)-N'-(2,5-endomethylene - 1,2,5,6 - tetrahydrobenzyl)urea is mixed thoroughly with the rest of the ingredients and then capsulated.

(2) SOFT GELATIN CAPSULES

One-piece soft gelatin capsules for oral use, each containing 50 milligrams of N-(3,4-dichlorobenzenesulfonyl)-N'-(2,5-endomethylene-1,2,5,6-tetrahydrobenzyl)urea are prepared in the usual manner by first dispersing the active ingredient in sufficient corn oil to render the material capsulatable.

(3) OIL SUSPENSION

An oil suspension for oral use, containing in each 5 milliliters 500 milligrams of N-(4-methylbenzenesulfonyl) - N' - (2,5 - endomethylene - 1,2,5,6 - tetrahydrobenzyl)urea is prepared from the following types and amounts of materials:

| | |
|---|---|
| Sweetening agent, gm. | 3.5 |
| N - (4 - methylbenzenesulfonyl) - N' - (2,5 - endomethylene-1,2,5,6-tetrahydrobenzyl)urea, gm. | 1000 |
| Preservatives, gm. | 20 |
| Antioxidant, gm. | 1 |
| Flavoring, ml. | 25 |
| Aluminum monostearate-corn oil gel to make 10,000 ml. | |

(4) TABLET 10,000 oral tablets each containing 150 milligrams of N - (4 - chlorobenzenesulfonyl) - N' - (2,5 - endomethylene -1,2,5,6-tetrahydrobenzyl)urea are prepared from the following types and amounts of materials:

| | Gm. |
|---|---|
| N - (4 - chlorobenzenesulfonyl) - N' - (2,5 - endomethylene-1,2,5,6-tetrahydrobenzyl)urea | 1500 |
| Dibasic calcium phosphate | 3050 |
| Methylcellulose, U.S.P. (15 cys.) | 65 |
| Talc, bolted | 450 |
| Calcium stearate, fine powder | 35 |

The ingredients are mixed in a conventional manner and compressed into tablets, each containing 150 mg. of active ingredient.

(5) SYRUP

A sugar-free syrup for oral use containing in each 5 milliliters 500 milligrams of N-(4-propylbenzenesulfonyl)-N'-(2,5-endomethylene - 1,2,5,6 - tetrahydrobenzyl) urea is prepared from the following types and amounts of materials:

| | |
|---|---|
| N - (4 - propylbenzenesulfonyl) - N' - (2,5 - endomethylene-1,2,5,6-tetrahydrobenzyl)urea, gm. | 1000 |
| Methylparaben, U.S.P., gm. | 3 |
| Sorbic acid, gm. | 3 |
| Sweetening agent, gm. | 18 |
| Flavoring, ml. | 3 |
| Glycerin, ml. | 1,500 |
| Deionized water to make 10,000 ml. | |

A dose of 1 teaspoonful (5 ml.) to 1 tablespoonful (15 ml.) will give the patient 500 to 1500 mg. of N-(4-propylbenzenesulfonyl) - N' - (2,5 - endomethylene - 1,2,5,6-tetrahydrobenzyl)urea.

The dosage of the novel compounds of the present invention for the tretament of diabetes depends on the age, weight, and condition of the patient being treated. Generally speaking, for adult oral administration the preferred unit dosage is 35 to 1000 mg. of active compound with a suitable pharmaceutical diluent and/or lubricant. One or two unit dosages are given one to four times a day. A total daily dose of from 125 to 3000 mg. embraces the preferred range for the treatment of diabetes. The total daily dose can be administered as a single dose, but preferably is administered in divided doses.

I claim:

1. An oral composition effective for the lowering of blood sugar containing as active ingredient 35 to 1,000 mg. of an N-arylsulfonyl-N'-(2,5-endomethylene-1,2,5,6-tetrahydrobenzyl)urea of the formula:

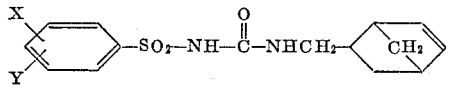

wherein X and Y are selected from the group consisting of hydrogen, alkyl of 1 to 4 carbon atoms, inclusive, alkoxy of 1 to 4 carbon atoms, inclusive, alkanoyl of 2 to 4 carbon atoms, inclusive, halogen, and amino and a diluent amount of a pharmaceutically acceptable carrier.

2. An oral composition effective for the lowering of blood sugar containing as active ingredient 35 to 1000 mg. of N-(4-methylbenzenesulfonyl)-N'-(2,5-endomethylene-1,2,5,6-tetrahydrobenzyl)urea and a pharmaceutical diluent.

3. An oral composition effective for the lowering of blood sugar containing as active ingredient 35 to 1000 mg. of N-(4-chlorobenzenesulfonyl)-N'-(2,5-endomethylene-1,2,5,6-tetrahydrobenzyl)urea and a pharmaceutical diluent.

4. A tablet suitable for oral administration and the lowering of blood sugar in the treatment of diabetes containing about 35 to 1,000 mg. of N-(4-methylbenzenesulfonyl) - N' - (2,5 - endomethylene - 1,2,5,6 - tetrahydrobenzyl)urea and a pharmaceutical diluent.

5. A tablet suitable for oral administration and the lowering of blood sugar in the treatment of diabetes containing about 35 to 1,000 mg. of N-(4-chlorobenzenesulfonyl) - N' - (2,5 - endomethylene - 1,2,5,6 - tetrahydrobenzyl)urea and a pharmaceutical diluent.

6. A process for the lowering of blood sugar in the treatment of diabetes in mammals which comprises orally administering an effective amount of a composition having as the essential active ingredient a compound selected from the group consisting of sulfonylureas of the formula:

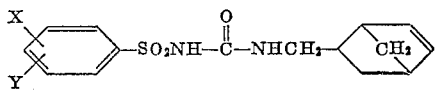

wherein X and Y are selected from the group consisting of hydrogen, alkyl of 1 to 4 carbon atoms, inclusive, alkoxy of 1 to 4 carbon atoms, inclusive, alkanoyl of 2 to 4 carbon atoms, inclusive, halogen, and amino.

7. A process for the lowering of blood sugar in the treatment of diabetes in mammals which comprises orally administering an effective amount of a composition having as the essential active ingredient N-(4-methylbenzenesulfonyl) - N' - (2,5 - endomethylene - 1,2,5,6 - tetrahydrobenzyl)urea.

8. A process for the lowering of blood sugar in the treatment of diabetes in mammals which comprises orally administering an effective amount of a composition having as the essential active ingredient N-(4-chlorobenzenesulfonyl) - N' - (2,5 - endomethylene - 1,2,5,6 - tetrahydrobenzyl)urea.

References Cited by the Examiner

UNITED STATES PATENTS

| | | | |
|---|---|---|---|
| 2,907,692 | 10/1959 | Haack et al. | 167—65 |
| 2,953,578 | 9/1960 | Haack et al. | 167—65 |
| 2,964,560 | 12/1960 | Haack et al. | 167—65 |
| 2,968,158 | 1/1961 | Ruschig et al. | 167—65 |
| 2,975,212 | 3/1961 | Wagner et al. | 167—65 |
| 2,976,317 | 3/1961 | Ruschig et al. | 167—65 |
| 3,021,368 | 2/1962 | Blank et al. | 167—65 |
| 3,095,447 | 6/1963 | Stoll et al. | 167—65 |
| 3,097,240 | 7/1963 | Aumuller et al. | 167—65 |
| 3,097,241 | 7/1963 | Karger et al. | 167—65 |
| 3,100,208 | 8/1963 | Haack et al. | 167—65 |

JULIAN S. LEVITT, *Primary Examiner.*

FRANK CACCIAPAGLIA, JR., *Examiner.*